(12) United States Patent
Loreth

(10) Patent No.: US 10,807,103 B2
(45) Date of Patent: Oct. 20, 2020

(54) DEVICE FOR CLEANING OF INDOOR AIR

(71) Applicant: Andrzej Loreth, Åkersberga (SE)

(72) Inventor: Andrzej Loreth, Åkersberga (SE)

(73) Assignee: Eurus AirTech AB, Akersberga (SE)

( * ) Notice: Subject to any disclaimer, the term of this patent is extended or adjusted under 35 U.S.C. 154(b) by 187 days.

(21) Appl. No.: 15/736,409

(22) PCT Filed: Jun. 17, 2016

(86) PCT No.: PCT/SE2016/050592
§ 371 (c)(1),
(2) Date: Dec. 14, 2017

(87) PCT Pub. No.: WO2016/204688
PCT Pub. Date: Dec. 22, 2016

(65) Prior Publication Data
US 2018/0169666 A1  Jun. 21, 2018

(30) Foreign Application Priority Data

Jun. 17, 2015 (SE) ...................................... 1550830

(51) Int. Cl.
*B03C 3/41* (2006.01)
*B03C 3/02* (2006.01)
(Continued)

(52) U.S. Cl.
CPC ................ *B03C 3/41* (2013.01); *B03C 3/025* (2013.01); *B03C 3/06* (2013.01); *B03C 3/12* (2013.01);
(Continued)

(58) Field of Classification Search
CPC combination set(s) only.
See application file for complete search history.

(56) References Cited

U.S. PATENT DOCUMENTS 4,244,710 A   1/1981 Burger
4,812,711 A * 3/1989 Torok ..................... H01T 23/00
                                              261/DIG. 42
(Continued)

FOREIGN PATENT DOCUMENTS

SE      533 460 C2   10/2010
WO   WO 89/00355 A1   1/1989
(Continued)

*Primary Examiner* — Christopher P Jones
*Assistant Examiner* — Sonji Turner
(74) *Attorney, Agent, or Firm* — Blank Rome LLP

(57) ABSTRACT

A device for cleaning of indoor air comprising capacitor precipitators, each consisting of two electrode elements or two groups of electrode elements connected to the respective pole of a high voltage source, air transported fans, at least one corona electrode and at least one counter electrode. The corona electrode and the counter electrode are each connected to the respective pole of a high voltage source. The device includes two air flow ducts for the air to be cleaned, which air flow ducts are placed along an axial reference line (AA) at a distance (d) from each other in the direction of the axial reference line (AA). Each air flow duct is associated with a capacitor precipitator and an air moving fan. At least one corona electrode is provided in the space between the air flow ducts. At least one counter electrode is located adjacent to the air flow ducts circumference. The air flow direction through the one air flow duct is diametrically opposite the air flow direction through the second air flow duct, and the air to be cleaned is passed into the space between the air flow ducts.

7 Claims, 3 Drawing Sheets

(51) Int. Cl.
*B03C 3/12* (2006.01)
*B03C 3/86* (2006.01)
*B03C 3/36* (2006.01)
*B03C 3/60* (2006.01)
*B03C 3/49* (2006.01)
*B03C 3/06* (2006.01)
*F24F 3/16* (2006.01)

(52) U.S. Cl.
CPC ............... *B03C 3/368* (2013.01); *B03C 3/49* (2013.01); *B03C 3/60* (2013.01); *B03C 3/86* (2013.01); *F24F 3/1603* (2013.01); *F24F 3/166* (2013.01); *B03C 2201/10* (2013.01); *F24F 2003/1635* (2013.01); *Y02A 50/21* (2018.01)

(56) References Cited

U.S. PATENT DOCUMENTS

| | | | | |
|---|---|---|---|---|
| 5,024,685 | A * | 6/1991 | Torok | H01T 19/00 361/230 |
| 5,180,404 | A * | 1/1993 | Loreth | C01B 13/11 315/111.91 |
| 6,203,600 | B1 * | 3/2001 | Loreth | B03C 3/49 96/40 |
| 8,679,409 | B2 * | 3/2014 | Zhang | B03C 3/09 422/121 |
| 8,834,799 | B2 * | 9/2014 | Loreth | B03C 3/12 422/121 |
| 2006/0107834 | A1 | 5/2006 | Vandenbelt et al. | |
| 2007/0145166 | A1 * | 6/2007 | Loreth | B03C 3/09 239/690 |

FOREIGN PATENT DOCUMENTS

WO    WO 97/46322 A1    12/1997
WO    WO 2005/037420 A2    4/2005

* cited by examiner

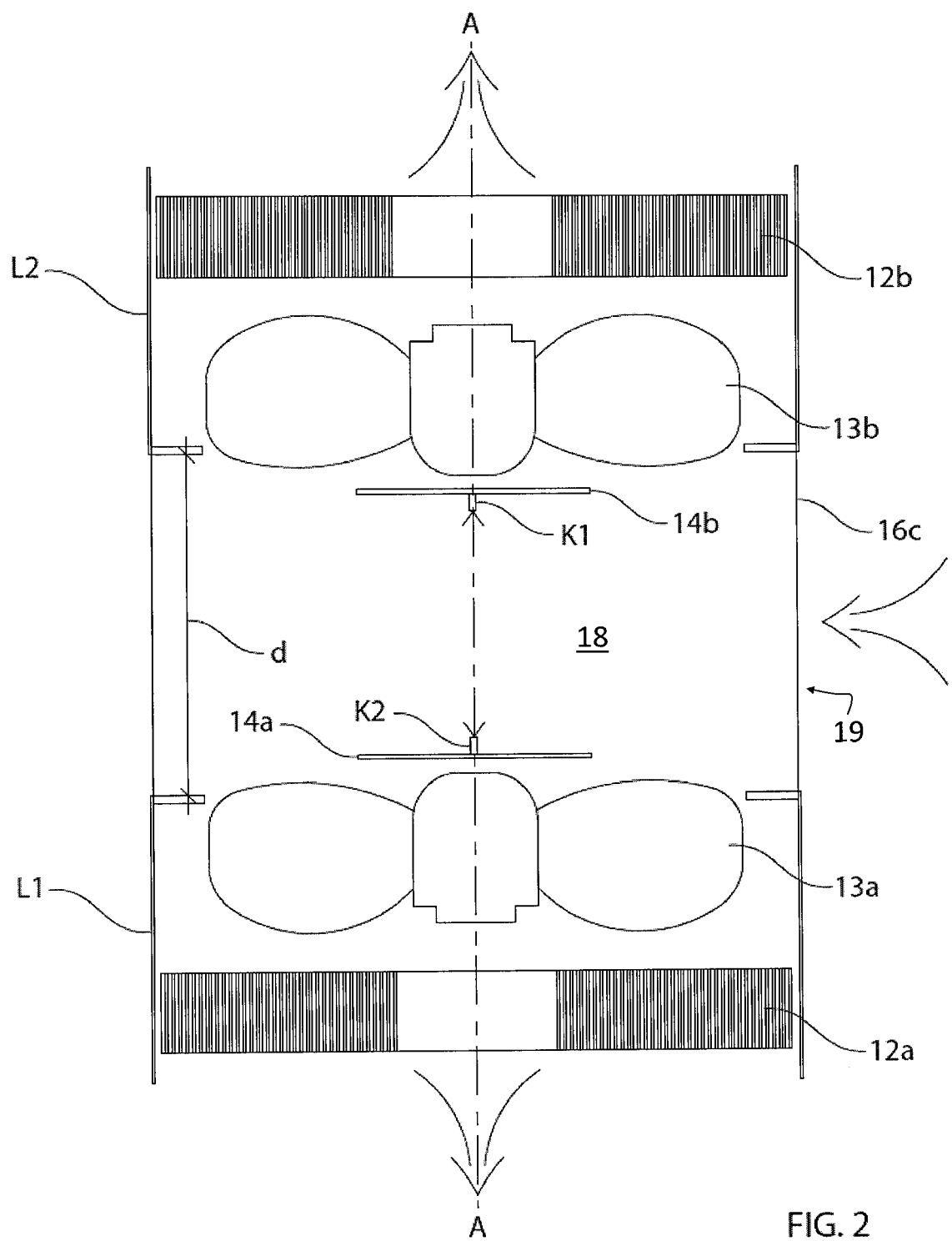
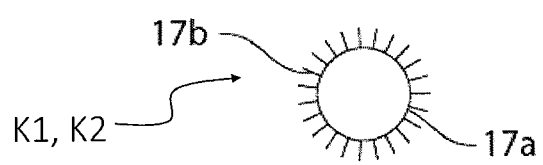
FIG. 3

DEVICE FOR CLEANING OF INDOOR AIR

The invention relates to an air cleaning apparatus, particularly an apparatus for cleaning of room air was provided with this air in residential, office or industrial premises. More particularly, the invention relates to an air cleaning device that comprises an ionizer with at least one corona electrode and a counter electrode, as well as two separate dust precipitators electrostatically connected to the high voltage supply and including a passage for the air to be cleaned and comprising two alternating electrode elements or two groups of elements arranged alternately with a gap distance from each other and arranged to be at different potential, wherein an electrostatic field is created in the gap between the electrodes. The transportation of air is provided by two fans, each one providing the air transport through one or the other electrostatic precipitator.

Air cleaning devices of today consist of a corona electrode surrounded by a so-called counter electrode, together forming an ionization chamber of an electrostatic precipitator and are known as two-step electrostatic precipitators. Ionization chambers, which often are comprised of the counter electrode walls and the corona electrode are well-defined areas in which the charging of the particles of the air takes place.

One way to achieve efficient charging of airborne dust is to push the corona with heavy corona but when doing so development of ozone becomes strong, which is not desirable. Some manufacturers of two-step electro filter therefore use special ozone filter to avoid such problems.

Another way to achieve efficient charging with low ozone emission i.e. low corona current is to design the ionization chamber such that the charging space defined by the ionization chamber, through which the airborne particles pass on their way to the capacitor, is large in the air flow direction, such that the passing time for particles in this area is long and hence such that the time available to charging is long. SE-B 469 466 discloses a two-step electrostatic filter which thus achieving effective charging is provided.

However, there are drawbacks to the design of the ionization of the above patent. Namely, the large volume of the ionization chamber results in bulky appliances. This is especially true in the use of high resistivity capacitor precipitators disclosed in SE A 9602211-6 which provide the opportunity to design relatively large capacitor precipitator with a diameter of up to 100 cm or even larger. A matching ionization chamber to such circular capacitor precipitators should also preferably be tubular with a diameter and length measured in the direction of airflow that are roughly equivalent to the radius of the capacitor precipitator.

Since a few years, the debate about indoor air quality and its impact on human health has more and more been focused on the presence of particles in the air inhaled. In this context, the interest in so-called standalone air cleaners has increased dramatically as a complement to traditional ventilation systems, or the lack of such. This puts substantial demands on the ability of such devices to significantly reduce airborne contaminants without damaging ozone production combined with low noise, high air cleaning capacity and low energy consumption. In addition to this there are also requirements on the adaptation of the appliances to the indoor environment regarding size, suitable positioning opportunities and, not least, serviceability.

In U.S. Pat. No. 6,398,852 B1 an apparatus of the above defined kind is disclosed with an object to reduce the dimensions of the air cleaning apparatus in air cleaning direction of the apparatus the proposed embodiments or on the use of circular symmetrical capacitor precipitator designed in accordance with SE-A 9602211-6 and with a maintained low generation of ozone. The efficiency is of course dependent on the dwell time of the air flow in the ionization chamber and the corona stream.

Another way of achieving an effective charging of the particles by means of very low corona stream is described in SE 9400110-4. According to this invention a unipolar ion source is arranged in connection to an assembly consisting of the capacitor precipitator, a blower and a high voltage source wherein the corona discharging electrode is so connected that the ions generated by the electrode are substantially free to diffuse from the corona electrode into the space where the air mass to be cleaned is housed. Thus, the space in which the device is located constitutes a large source chamber. The residence time of the particles is thus very long in order to allow the use of extremely low corona current.

Although the above described method works to create an efficient charging of aerosol particles using extremely low corona discharge. The disadvantages of such a solution is that some of the dust particles are deposited on the walls.

An improved embodiment of the efficient charging of particles in the air stream over that presented in the above-mentioned SE 9400110-4 is introduced in the European Patent Application No. 09816518.6. According to this invention the movement of ions from the corona electrode is limited towards the room to an almost spherical area extending from the corona electrode to a surrounding counter electrode formed almost as a ring which surrounds the inlet flow to the device.

However, there are also disadvantages with this solution. Namely, a large capacitor precipitator is not adapted to cleaned by means of for example rinsing under running water or in the sink, which has become possible thanks to a new Swedish invention which is described in WO 2013/105885. This invention allows to produce the capacitor precipitator paper electrodes, designed according to SE-A 9602211-6, resistant to moisture intrusion from the electrode edge sections.

Another disadvantage of the is the proposed external ionization patent specification, which is limited to a spherical volume adjacent to the corona which itself requires the position of the appliance and of course you can contact with the corona cause unpleasant electrostatic shock.

SUMMARY OF THE INVENTION

The present invention provides a different way for an air cleaning apparatus of the above described kind to achieve a relatively very high cleaning capacity (CADR) at extremely low noise level combined with a relatively smaller (in terms of diameter) capacitor divider and with an air cleaning device with relatively small dimensions. Due to the use of smaller capacitor precipitator may also wish washing (rinsing) of these used.

The invention relates to a device for cleaning indoor air, comprising two capacitor precipitators each consisting of two electrode elements or two groups of electrode elements connected to different poles of a high voltage source, air transporting fans, at least one corona electrode and at least one counter electrode, wherein the corona electrode and the counter electrode are connected to respective pole of a high voltage source. Further, the device comprises two cylindrical air flow ducts for the air to be cleaned, which air flow ducts are coaxially located along an axial reference line AA and at a distance from each other in the axial reference line direction, wherein each air flow duct is associated with a capacitor precipitator and an air moving fan, and at least one corona electrode is provided in the space between the air flow ducts, at least one counter electrode is disposed in the air flow ducts periphery, to generate at least one electrostatic field between the corona electrode and the counter electrode, and wherein the air flow through one air flow passage is diametrically opposite the air flow direction through the second air flow duct, and that the air to be cleaned is passed into the space between the air flow passages via the electrostatic field.

With the inventive design a compact and effective air cleaning is achieved in which all of the air entering the device must pass through the electrostatic field before passing into the respective air flow duct, so that all the incoming particles are charged prior to passing the electrode elements, wherein a maximum number of particles can be captured by the electrode elements.

In a specific embodiment, at least two counter electrodes are provided which include a respective flat annular surface, wherein each air flow duct is associated with such a surface, the annular surfaces defining an opening of a diameter somewhat larger than the associated impeller of the fan, wherein the annular surfaces have a extension substantially perpendicular to the air flow direction through the respective air flow duct and at the air flow duct viewed from the air transport inlet direction through the air flow duct.

In another specific embodiment, a tube-like counter electrode is provided which extends between the adjacent ends of the air flow ducts. The tube-like counter-electrode may be provided as a supplement to counter electrodes, each with a flat annular surface.

The corona electrode may be formed as a carbon brush extending axially and secured in a holder. The corona electrode may also comprise two carbon brushes, which extend axially facing each other.

In another embodiment, the corona electrode is formed as a thin wire extending axially between holders.

In yet another embodiment, the corona electrode is designed as a ring that is mounted axially in the space between the air flow ducts, wherein the periphery of the ring is provided with corona generating elements of the type comprising carbon fiber bristles, small tips or the like.

BRIEF DESCRIPTION OF THE FIGURES

The invention is in the following explained with reference to the accompanying drawings, wherein:

FIG. 2 schematically shows a modified air cleaning device.

FIG. 3 schematically shows a modified solution of the corona.

DETAILED DESCRIPTION OF THE INVENTION

Figure 1:
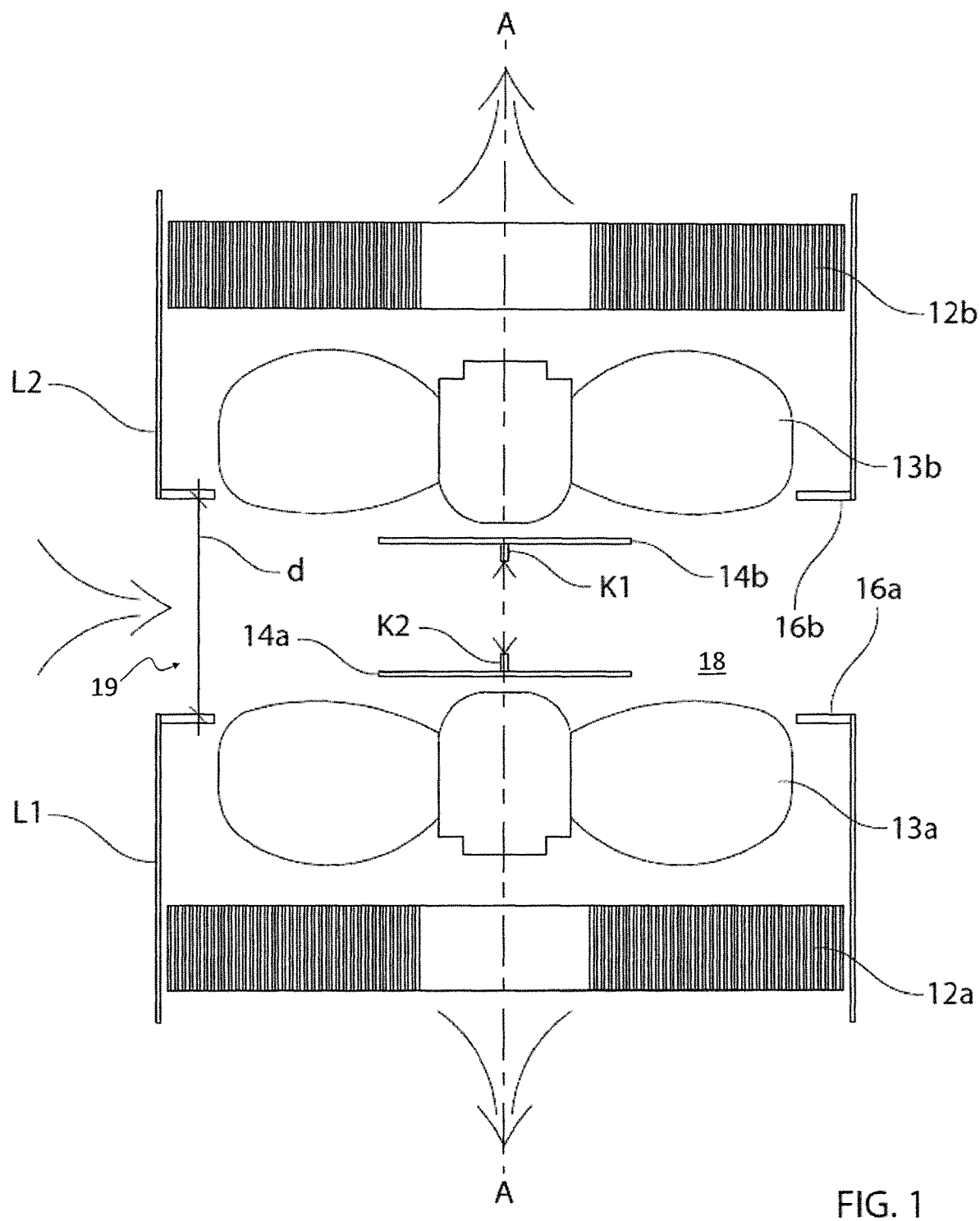
FIG. 1 schematically shows a cross section through an air cleaning apparatus in accordance with the invention.

The air cleaning device shown in FIG. 1 comprises two tube-shaped air flow passages L1, L2 arranged axially to each other and spaced with an axial distance "d" to each other wherein the two circular capacitor precipitators 12a and 12b, respectively, are arranged (seen from the air flow direction through the device) one at the outlet of the air flow duct L1 and one at the outlet of the air flow duct L2. The corresponding capacitor precipitator is accompanied by an air moving fan 13a and 13b, respectively, and by a holder 14a and 14b, respectively, the latter being designed as annular plates of electrically insulating material. A carbon brush (corona) K1, K2 is disposed in the center of the respective holders 14a, 14b.

The air flow duct L1, L2 is larger than the respective diameter of the impeller of the fan 13a and 13b with an angular surface (counter electrode) 16a and 16b, respectively, extending from each fan impeller and the respective tubular casing of the air flow ducts L1, L2.

Figure 4:
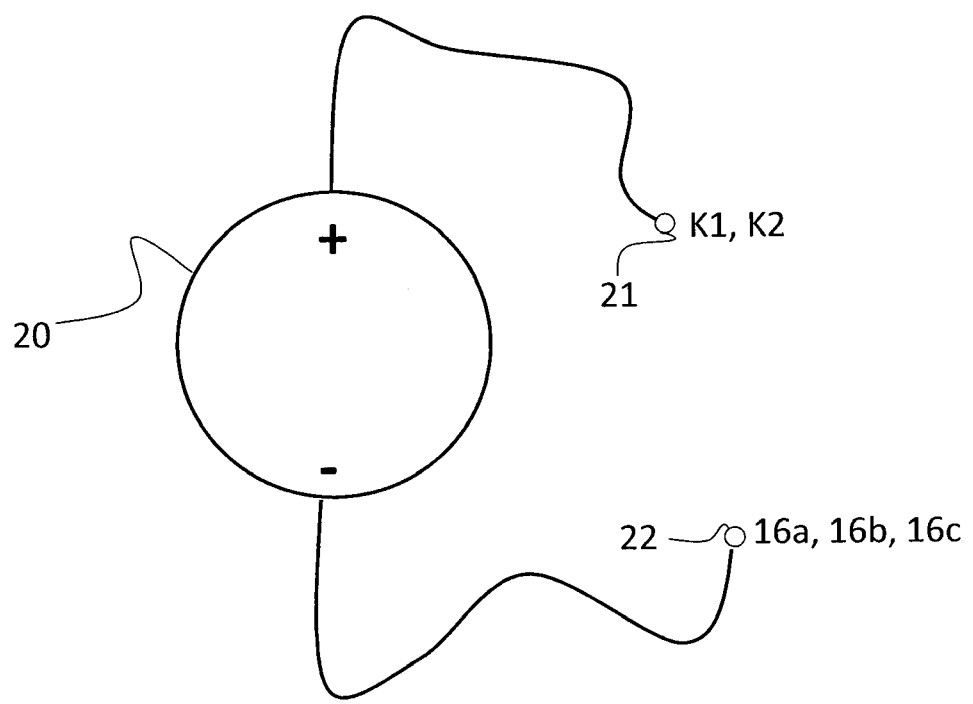
FIG. 4 schematically shows the connection of the corona electrode and the counter electrode to respective poles of a high voltage source.

The capacitor precipitators are designed according to SE-A 9602211-6 i.e. comprising two band-like electrode elements connected to the respective pole+,− of a high voltage source 20, as shown in FIG. 4. The corona electrodes K1, K2 are electrically connected to the appropriate terminal of the high voltage source (shown as the + terminal in FIG. 4), whereby an electrostatic field formed between corona electrodes K1, K2 and counter electrodes 16a and 16b, which are made from or lined with conductive or semi-conductive material and electrically grounded. Thereby a ionization chamber 18 is formed extending from the corona electrodes K1, K2 to the counter electrodes 16a, 16b.

FIG. 2 shows a modified embodiment of the apparatus wherein the inlet 19 of the ionization chamber 18 is provided with an air permeable cylindrical surface (counter electrode 16c), which is electrically connected to the same voltage pole as the counter electrodes 16a, 16b. Thereby the electrostatic field is slightly changed from the corona electrodes to the counter electrodes. In practice a greater air volume (larger ionization chamber) is achieved for charging of the particles in the incoming air flow.

As is shown in FIG. 1, the respective corona electrode K1, K2 face each other and are quite close together. The fact that they are electrically connected to the same pole of a high voltage source forces the ion clouds formed by the respective corona K1, K2 to spread radially and in the direction towards the counter electrodes 16a, 16b, 16c corresponding to the opposite direction to the incoming air flow.

The influx of air to be cleaned is such that all air entering the device must pass through the electrostatic field formed between the corona electrode or electrodes K1, K2 and the counter electrodes 16a, 16b, 16c. In the case shown in FIG. 1 where two annular counter electrodes 16a, 16b are provided, the air inlet 19 is disposed axially between these, so that the incoming air stream is divided into partial air streams. The first partial air stream passes through the electrostatic field formed between a first corona electrode K1 and a first annular counter electrode 16b and further (to the right in the figure) by a first fan 13b and through a first capacitor precipitator 12b, in which charged particles are trapped. The first partial air stream thus passes to the left in the figure through the electrostatic field formed between a second corona electrode K2 and a second annular counter electrode 16a and further past a second fan 13a and through a second capacitor precipitator 12a, arranged to collect charged particles. The air transport direction through the device is shown by the arrows in FIG. 1.

Laboratory tests show that even so-called quiet fans, such as brand Ebmpapst® in combination with capacitor precipitator according to SE-A 9692211-6 i.e. a capacitor precipitator with extremely low air resistance cannot provide greater airflow than 1 m/s to and maintain quiet operation. Actually, the range of 0.5-0.75 m/s, more suitable to achieve silent or quiet operation which is the primary purpose of this invention. It is also vital to provide efficient charging of particles, which as previously described in SE 940010-4, requires relatively large source chamber (long dwell time) if the demand for low ozone development must be fulfilled.

The surprise of the present invention is that even at relatively small distance "d", sufficient charging of particles is achieved and thereby also the requirements for large capacity air cleaning (CADR) in combination with low noise and negligible ozone generation are achieved.

Laboratory tests show that the minimum distance "d" should not be less than 30% of the air flow scan lens L1, L2 radius and preferably not less than ½ radius.

In order not to disturb the electrostatic field formed between corona electrodes K1, K2 and counter electrodes 16a, 16b and 16c the impeller blades should be made of electrically insulating material, e.g. plastic. There are also requirements on the design of the holder 14a, 14b so that those cover the motors of the fan, which are generally made of metal and grounded, by overlap.

A practical example of the device of the present invention comprises two capacitor precipitators with 400 mm diameter and 50 mm wide electrode element, an ionization chamber with distance "d" equal to 120 mm and two fans with 300 mm diameter. With an air flow rate of about 0.7 m/s about 600 m3/h CADR is achieved, which is very much for this type of device at quiet operation.

In the embodiment shown in FIG. 2, the counter electrode 16c is formed of a perforated cylindrical surface. The counter electrode 16c may also be formed of e.g. fins or other suitable means forming a perforated cylindrical shape. The influx of air to be cleaned is thus effected through the perforated cylindrical surface so that all the air entering the device is forced to pass through the electrostatic field formed between the corona electrode or electrodes K1, K2 and the perforated cylindrical surface of the counter electrode 16c.

The use of such a counter electrode 16c defines the extension of the ionization chamber from corona electrode/electrodes to the perforated cylindrical surface of the counter electrode 16c. A counter electrode 16c with a perforated cylindrical surface can be combined with ring-shaped counter electrodes 16a, 16b. In some cases, where the air velocity through the capacitor precipitators is lower than 0.7 m/s, however, the counter electrode 16c alone define the ionization chamber. The surfaces 16a, 16b may be formed of an insulating material.

The diameter of the counter electrode 16c can be greater than the air flow duct diameter. As for the counter electrodes 16a and 16b, respectively, these can be seen from the circular opening around the fan impeller transform to square or rectangular surfaces.

Regarding the corona electrodes K1, K2, laboratory tests have shown that it is not necessary to provide two corona electrodes. A corona electrode in the form of a carbon fiber brush alone can provide charging of the particles.

A suitable design of the corona electrode is also shown in FIG. 3 which electrode consists of a ring 17a disposed axially in the air gap between the flow passages L1 and L2, respectively, wherein the ring's periphery consists of corona elements 17b of the type comprising carbon fiber blades, or small laces.

It is of course not necessary that the corona electrode is formed as a carbon fiber brush. Other prior art corona elements can be used. It is essential that these are designed substantially axially symmetrical with respect to the counter electrodes. Further, it is important that all the air drawn into the device is forced to go through the electrostatically charged field between the corona electrode and the counter electrode, so that substantially all particles are charged.

Even an elongated corona electrode in the form of a thin wire disposed axially eligible.

The present invention is not limited to any specific polarity of the accession of the electrode elements of the capacitor precipitators or the polarity of the corona.

Hence, the corona can also be connected, e.g., to the grounded pole of a high voltage source, wherein the counter electrode may be connected to another pole of high voltage source negative or positive.

In an alternative embodiment, the air moving fans 13a, 13b are interchanged with the corresponding capacitor precipitator 12a, 12b.

The invention claimed is:

1. A device for cleaning of indoor air, comprising two capacitor precipitators, each including at least one corona electrode and at least one counter electrode, wherein said at least one corona electrode and said at least one counter electrode are each connected to a respective pole of a high voltage source, wherein the device comprises two cylindrical air flow ducts, the two cylindrical air flow ducts being coaxially located along an axial reference line and spaced apart from each other, and wherein:

each of the two cylindrical air flow ducts is associated with a respective one of the capacitor precipitators and includes a respective air transporting fan, the at least one corona electrode of each capacitor precipitator is provided in the space between the air flow ducts, and the at least one counter electrode of each capacitor precipitator is disposed at a periphery of a respective one of the two cylindrical air flow ducts, thereby generating an electrostatic field between the at least one corona electrode and the counter at least one electrode of each capacitor precipitator, and the air respective transporting fan of each of the air flow ducts is arranged to operate such that air flows through a first one of the two cylindrical air flow ducts in a direction which is diametrically opposite to the direction of air flowing through of a second one of the air flow ducts, and the air to be cleaned is passed into the space between the two air flow ducts and through the electrostatic field.

2. The device according to claim 1, wherein the at least one counter electrode comprises two counter electrodes, each have a respective flat annular surface, wherein the annular surfaces define an opening of a diameter larger than an impeller of the respective air transporting fan, and wherein the annular surfaces extend substantially perpendicular to air flow through the respective cylindrical air flow ducts.

3. The device according to claim 1, wherein a tube-like counter electrode extends between the adjacent ends of the two cylindrical air flow ducts.

4. The device according to claim 1, wherein the at least one corona electrode is designed as a carbon brush extending axially and being secured in a holder.

5. The device according to claim 1, wherein the at least one corona electrode consists of two carbon brushes, which extend axially and face each other.

6. The device according to claim 1, wherein the at least one corona electrode is a thin wire extending axially between holders.

7. The device according to claim 1, wherein the at least one corona electrode is designed as a ring that is mounted axially in a space between the two cylindrical air flow ducts, and wherein a periphery of the ring is provided with corona elements comprising carbon fiber bristles or small tips.

* * * * *